United States Patent [19]

Tyagi et al.

[11] Patent Number: 5,298,355

[45] Date of Patent: Mar. 29, 1994

[54] TONER COMPOSITION WITH SEMI-CRYSTALLINE POLYESTER WAX AND METHOD OF PREPARATION

[75] Inventors: Dinesh Tyagi, Fairport; Donna A. Di Prima; Louis J. Sorriero, both of Rochester, all of N.Y.

[73] Assignee: Eastman Kodak Company, Rochester, N.Y.

[21] Appl. No.: 975,741

[22] Filed: Nov. 13, 1992

[51] Int. Cl.$^5$ .............................................. G03G 9/097
[52] U.S. Cl. .................................... 430/110; 430/137
[58] Field of Search ................................ 430/110, 137

[56] References Cited

U.S. PATENT DOCUMENTS

| | | |
|---|---|---|
| 3,985,830 | 10/1976 | Fetters et al. |
| 4,027,048 | 5/1977 | Crystal . |
| 4,557,991 | 12/1985 | Takagiwa et al. .................. 430/109 |
| 4,758,506 | 7/1988 | Lok et al. ..................... 430/106.6 X |
| 4,814,253 | 3/1989 | Gruber et al. ................... 430/106.6 |
| 4,833,060 | 5/1989 | Nair et al. ........................ 430/137 |
| 4,835,084 | 5/1989 | Nair et al. ........................ 430/137 |
| 4,965,131 | 10/1990 | Nair et al. ........................ 428/407 |
| 5,004,664 | 4/1991 | Fuller et al. ................... 430/110 X |
| 5,118,588 | 6/1992 | Nair et al. ........................ 430/110 |

FOREIGN PATENT DOCUMENTS 59-147044A 8/1984 Japan .
2075703 11/1981 United Kingdom .

OTHER PUBLICATIONS

Froix, "Lowering the Energy of Fusing Through the Use of Dispersed Semicrystalline Polymeric Plasticizers" Xerox Discl. Jour., vol. 4, No. 4, Jul./Aug. 1979, p. 461.

Primary Examiner—Roland Martin
Attorney, Agent, or Firm—Willard G. Montgomery

[57] ABSTRACT

A method is described for the preparation of electrostatographic toner particles which involves the surface treatment of a pigment by depositing thereon a coating of a low melting point hydrophobic semi-crystalline polyester wax. The method involves preparing a wax solution by dissolving at ambient temperature a low melting point hydrophobic semi-crystalline polyester wax in a first solvent capable of dissolving the wax at ambient temperature; forming a pigment dispersion by mixing at ambient temperature a pigment, a first polymer material and a second solvent in which the hydrophobic wax is insoluble at ambient temperature; admixing the wax solution with the pigment dispersion so resulting in precipitation of the wax upon the surface of the pigment; mixing the wax coated pigment dispersion thus formed with a solvent in which the hydrophobic wax is insoluble at ambient temperature and, optionally, a second polymer material and, optionally, a chargecontrol agent to form an organic phase; dispersing the organic phase in an aqueous phase comprising a particulate stabilizer and, optionally, a promoter; homogenizing the resultant mixture, and evaporating the solvent and washing and drying the resultant product.

19 Claims, No Drawings

TONER COMPOSITION WITH SEMI-CRYSTALLINE POLYESTER WAX AND METHOD OF PREPARATION

FIELD OF THE INVENTION

This invention relates to polymeric powders suitable for use as electrostatographic toner and to a method for the preparation thereof and, more particularly, to a method for the preparation of toner particles including a dispersed surface active pigment coated uniformly with a hydrophobic wax.

BACKGROUND OF THE INVENTION

Electrostatic toner polymer particles are commonly prepared by a process frequently referred to as "limited coalescence." In this process, polymer particles having a narrow size distribution are obtained by forming a solution of a polymer in a solvent that is immiscible with water, dispersing the polymer/solvent solution in an aqueous medium containing a solid colloidal stabilizer, and removing the solvent. The resultant particles are then isolated, washed, and dried.

In the practice of this technique, toner particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by the agitation employed.

Limited coalescence techniques of this type have been described in numerous patents pertaining to the preparation of electrostatic toner particles because such techniques typically result in the formation of toner particles having a substantially uniform size and uniform size distribution. Representative limited coalescence processes employed in toner preparation are described in U.S. Pat. Nos. 4,833,060 and 4,965,131.

In the conventional limited coalescence techniques described heretofore, the judicious selection of toner additives such as charge control agents and pigments permits control of the surface roughness of toner particles by taking advantage of the aqueous organic interphase present. However, if any toner additive employed for this purpose is highly surface active or hydrophilic in nature, it tends to be present at the surface of the toner particles. Unfortunately, this leads to numerous potential problems such as toner particles having lower charge/mass ratios, rougher particles, poor thermal transfer, poor electrostatic transfer, reduced pigment coverage, interference with the limited coalescence process, sensitivity to environment, and the like.

Accordingly, workers in the art have recognized that toner additives must either be avoided or kept away from the particle surface. One method for obviating this limitation is to select an additive which is neither surface active or hydrophilic in nature. However, it is often not feasible to find an alternative additive evidencing the properties sought. Thus, it then becomes necessary to modify the surface of the additive.

Efforts to achieve this end have generally focused upon the use of suitable dispersion aids as, for example, polymers with acid or other polar functionality as described in copending application Ser. No. 501,819, filed by M. Nair, Z. Pierce and D. Tyagi. These polymeric stabilizers are used to treat carbon pigment to prevent the hydrophilic carbon from migrating to the surface. Toners prepared in this manner evidence enhanced electrostatic transfer, reduced electrical conductivity, and low D-min or fog.

A similar treatment employed in conjunction with toners of smaller particle size has frequently been found unsuccessful due to an increase in solution viscosity of the organic phase at the concentration of dispersant and pigment level employed. Limited coalescence toners prepared with an organic phase of this type tend to yield particles of broad size distribution and tend to interfere with the limited coalescence process. Furthermore, use of this technique requires the presence of reactive sites on the additive surface of the toner particles to which a dispersant may associate.

Recently, a technique was described in copending application Ser. No. 890,053, filed May 28, 1992, entitled "Electrostatographic Toner Including A Wax Coated Pigment and Method for the Preparation Thereof", for obviating the foregoing limitations wherein a highly surface active pigment was coated with a hydrophobic wax which is insoluble in the solvents commonly employed in toner preparation. Studies revealed that the wax coating prevents the pigment from migrating to the surface of the toner and provides a spherical surface thereto. This results in a narrow distribution of charge from particle to particle and permits image transfer without the occurrence of fog in the background. The wax coating also reduces the likelihood of surface contamination by the pigment due to the fact that is kept away from the surface. Particulate material prepared in accordance with this technique evidences charging characteristics that render the particles suitable for use as electrostatographic toner particles.

The technique described comprises the steps of dissolving a low melting point wax in a solvent at an elevated temperature, admixing the resultant solution with a heated pigment dispersion in colloidal form, and permitting the mixture to cool slowly to ambient conditions, the wax precipitating upon the pigment surfaces during the cooling process; recovering the wax coated pigment particles from the mixture and mixing therewith a polymer material, a solvent and, optionally, a charge control agent to form an organic phase; dispersing the organic phase in an aqueous phase comprising a particulate stabilizer and, optionally, a promoter, homogenizing the mixture, evaporating the solvent and then washing and drying the resultant product.

Unfortunately, this technique requires the use of elevated temperatures to dissolve the wax in the solvent to form the wax solution prior to admixing the wax solution with the pigment dispersion and to heat the pigment dispersion prior to combining it with the wax solution. This is undesirable because the requirement of having to heat both the wax solution and the pigment dispersion in practicing this technique requires the expenditure of substantial amounts of time and energy which adds to the overall cost of producing the toner compositions by this technique.

SUMMARY OF THE INVENTION

In accordance with the present invention, the prior art limitations are effectively obviated by a novel process which embraces dissolving at ambient temperature a low melting point hydrophobic semi-crystalline polyester wax in a first solvent capable of dissolving the wax at ambient temperature to form a wax solution; forming a pigment dispersion by mixing at ambient temperature a pigment, a first polymer material and a second solvent in which the hydrophobic wax is insoluble at ambient temperature; admixing the wax solution with the pigment dispersion so resulting in the wax precipitating out upon the pigment surface as a coating thereon and changing its surface activity; mixing the wax-coated pigment dispersion thus formed with a second polymer material, if required and as dictated by the concentration of the pigment dispersion, a solvent in which the hydrophobic wax is insoluble at ambient temperature and, optionally, a charge-control agent to form an organic phase; dispersing the organic phase in an aqueous phase comprising a particulate stabilizer and, optionally, a promoter; homogenizing the resultant mixture, and evaporating the solvent and washing and drying the resultant product. Applicants have found that by utilizing two different solvents, i.e., one in which the hydrophobic wax is soluble at ambient temperature to form the wax solution and another solvent in which the wax is insoluble at ambient temperature to form the pigment dispersion and the organic phase, all heating requirements are eliminated from the prior art process and the cost of producing toners containing otherwise hydrophilic or surface active pigments which have been rendered non-surface active by wax encapsulation is substantially reduced.

Thus, viewed from one aspect, the present invention is directed to a method for the preparation of electrostatographic toner. The method comprises the steps of dissolving a low melting point hydrophobic semi-crystalline polyester wax in a first solvent capable of dissolving the wax at ambient temperature to form a wax solution; forming a pigment dispersion by mixing at ambient temperature a pigment, a first polymer material and a second solvent in which the hydrophobic wax is insoluble at ambient temperature; admixing the wax solution with the pigment dispersion so resulting in the wax precipitating out upon the pigment surface; mixing the wax coated pigment dispersion thus formed with a solvent in which the hydrophobic wax is insoluble at ambient temperature and, optionally, a second polymer material and, optionally, a charge-control agent to form an organic phase; dispersing the organic phase in an aqueous phase comprising a particulate stabilizer and, optionally, a promoter; homogenizing the resultant mixture, and evaporating the solvent and washing and drying the resultant product.

Viewed from another aspect, the present invention is directed to a process for preparing electrostatographic toner by dispersing an organic phase in an aqueous phase to yield a layer of particulate suspension stabilizer on the surface of the polymer. The improvement in the process comprises dissolving a low melting point hydrophobic semi-crystalline polyester wax in a first solvent capable of dissolving the wax at ambient temperature; forming a pigment dispersion at ambient temperature by mixing a pigment, a first polymer material and a second solvent in which the hydrophobic wax is insoluble at ambient temperature; admixing the wax solution with the pigment dispersion, so resulting in the wax precipitating out upon pigment surface. The wax-coated pigment dispersion thus formed is then mixed with a solvent and, optionally, a second polymer material and, optionally, a charge-control agent to form the organic phase in the aforementioned limited coalescence process.

These and other features and advantages of the present invention will be better understood taken in conjunction with the following detailed description and claims.

DETAILED DESCRIPTION OF THE INVENTION

In accordance with the present invention, a low melting point hydrophobic semi-crystalline polyester wax having a weight average molecular weight of from about 5,000 to 80,000 and a melting point within the range of 55° C. to 120° C. is dissolved in a solvent capable of dissolving the wax at ambient temperature.

Next, a pigment dispersion is prepared at ambient temperature by conventional techniques as, for example, media milling a first polymer (binder), a pigment and a second solvent in which the hydrophobic wax is insoluble at ambient temperature. In this process, the pigment is broken down into small pieces which mix with the polymer. It has been found advantageous in the practice of the invention to employ from about 4.5 to 18.0 percent, by weight, pigment, from about 0.5 to 2.0 percent, by weight, polymeric binder, the remaining being solvent. The pigment dispersion prepared as described is then admixed with the wax solution at ambient temperature. In this process, the wax present in solution slowly precipitates upon the surface of the dispersed pigment since the wax is insoluble in the solvent used to form the pigment dispersion. Following such preparation, the coated pigment dispersion is mixed with a solvent and, optionally, a second polymer material and, optionally, a charge-control agent to form an organic phase in which the pigment concentration may range from about 1 to 40%, by weight, based upon the total weight of solids. A preferred range has been found to range from 4 to 20%, by weight. The charge-control agent is employed in an amount ranging from 0 to 10 parts per hundred, based on the total weight of solids present, with a preferred range being from 0.2 to 3.0 parts per hundred. The solvent is employed in an amount ranging from about 250 to 900 percent by weight based upon the total weight of the final product (total weight of the solids present) and the second polymer is present in an amount ranging from 0 to 95 percent by weight, based upon the total weight of the final product. It will be appreciated that the solvent chosen for forming the organic phase is also one in which the hydrophobic wax is insoluble at ambient temperature so that the wax coatings formed upon the surface of the pigment particles will not dissolve in the organic phase and, further, that the solvent used to form the pigment dispersion and the organic phase can be the same or different as long as the hydrophobic wax is insoluble therein at ambient temperature.

Following this step, this mixture is permitted to stir overnight and is then dispersed in an aqueous phase comprising a particulate stabilizer and, optionally, a promoter.

The solvents chosen for use in the wax dissolution step may be selected from among any of the well known solvents capable of dissolving the hydrophobic waxes of the type employed herein at ambient temperatures. Typical of the solvents chosen for this purpose include straight or branched chain aliphatic hydrocarbons having from 5 to 10 carbon atoms, cyclic aliphatic hydrocarbons including cyclohexane and turpentine, aromatic hydrocarbons including toluene, xylene, and ethylbenzene, chlorinated hydrocarbons including methylene chloride, o-dichlorobenzene, chloroform, dichloromethane, and tri-chloroethanes, ethers including dioxane, tetrahydrofuan, and bisethoxyethylether, alcohols including diethylene glycol, 2-ethylbutanol, 2-ethylhexanol, and cyclohexanol, esters including ethyl acetate, cellosolve acetate, and butyl butyrate. The selection of specific solvents which are capable of dissolving a specific wax of the type employed herein is deemed to be within the scope of those skilled in the art. For example, dichloromethane is a particularly useful solvent for dissolving poly(decamethylene sebacate) at ambient temperatures and poly[hexamethylene terephthalate-co-succinate (70/30)] at ambient temperatures both of which have been found to be particularly useful hydrophobic waxes for use in the practice of the present invention. The only essential criteria is that the specific solvent used to form the wax solution is a solvent capable of dissolving the specific wax chosen for use in the practice of the present process at ambient temperature and that the solvent chosen will permit the wax to precipitate out of the solution onto the surfaces of the pigment particles when the wax solution is admixed with the pigment dispersion.

The solvents chosen for use in forming the pigment dispersion and the organic phase may be selected from among any of the well known solvents capable of forming a dispersion with the particular pigment selected for use in practicing the present invention, dissolving the polymers of the type employed herein to form the toner binder and are immiscible with water. Additionally, the solvent selected must also comprise a solvent in which the waxes utilized in the practice of the present invention are insoluble at ambient temperatures. The selection of such specific solvents is deemed to be within the scope of those skilled in the art and the solvents used to form the pigment dispersion and the organic phase can be the same or different as long as they meet the foregoing criteria. For example, ethyl acetate is a particularly useful solvent for forming a pigment dispersion when quinacridone magenta, Pigment Yellow 81 or bridged aluminum phthalocyanine cyan are used as pigments in forming the pigment dispersion utilized in the practice of the present invention and poly(decamethylene sebacate and dichloromethane are used in forming the wax solution. It should be readily apparent to one skilled in the art that the solvent chosen to dissolve the hydrophobic wax at ambient temperature must also be immiscible with water. In carrying-out the process of the present invention, the solvent which is used to prepare the wax solution is immiscible with the solvent used to form the pigment dispersion and the solvent used to form the organic phase and will merely become additive to the organic phase upon introducing the wax-coated pigment dispersion into the organic phase.

The particulate stabilizer selected for use herein may be selected from among highly cross-linked polymeric latex materials of the type described in aforementioned U.S. Pat. No. 4,965,131, or silicon dioxide. Each of these stabilizers has colloidal dimensions and is well suited for use in the practice of the present invention. The particulate stabilizer is generally used in an amount ranging from 1 to 15 parts based on 100 parts of the total solids employed.

Any suitable promoter that is water soluble and affects the hydrophilic/hydrophobic balance of the solid dispersing agent in the aqueous solution may be employed in order to drive the solid dispersing agent, that is, the particulate stabilizer, to the polymer/solvent droplet-water interface. It will be appreciated by those skilled in the art that the promoter is required only when silica is employed as the stabilizing agent. When latex is employed for this purpose, the hydrophobic/hydrophilic characteristics are provided by the choice of co-monomers used. Typical of such promoters are sulfonated polystyrenes, alginates, carboxy methyl cellulose, tetramethyl ammonium hydroxide or chloride, diethylaminoethylmeythacrylate, water soluble complex resinous amine condensation products such as the water soluble condensation products of diethanol amine and adipic acid, water soluble condensation products of ethylene oxide, urea and formaldehyde and polyethyleneimine. Also effective for this purpose are gelatin, glue, casein, albumin, gluten and the like or nonionic materials such as methoxycellulose. The promoter is generally used in an amount ranging from about 0.2 to 0.6 parts per 100 parts of aqueous solution.

Various additives generally present in electrostatographic toner may be added to the polymer prior to dissolution in the solvent or in the dissolution step itself, such as charge-control agents. Suitable charge-control agents are disclosed, for example, in U.S. Pat. Nos.3,893,935; 4,079,014; 4,323,634 and British Patent Nos. 1,501,085 and 1,420,839. Charge-control agents are generally employed in small quantities such as from about 0 to about 10 parts per hundred based upon the weight of the total solids content (weight of the toner) and preferably from about 0.2 to about 3.0 parts per hundred.

The resultant mixture is then subjected to mixing and homogenization. In this process, the particulate stabilizer forms an interface between the organic globules in the organic phase. Due to the high surface area associated with small particles, the coverage by the particulate stabilizer is not complete. Coalescence continues until the surface is completely covered by particulate stabilizer. Thereafter, no further growth of the particles occurs. Accordingly, the amount of the particulate stabilizer is inversely proportional to the size of the toner obtained. The relationship between the aqueous phase and the organic phase, by volume, may range from 1.5:1 to approximately 9:1. This indicates that the organic phase is typically present in an amount from about 10% to 40% of the total homogenized volume.

Following the homogenization treatment, the solvent present is evaporated and the resultant product washed an dried.

As indicated above, the present invention is applicable to the preparation of polymeric toner particles from any type of polymer that is capable of being dissolved in a solvent that is immiscible with water and includes compositions such as, for example, olefin homopolymers and copolymers, such as polyethylene, polypropylene, polyisobutylene and polyisopentylene; polyfluoroolefins, such as polytetrafluorethylene and polytrifluorochloroethylene; polyamides, such as polyhexamethylene adipamide, polyhexamethylene sebacamide, and polycaprolactam; acrylic resins, such as polymethylmethacrylate, polymethylacrylate, polyethylmethacrylate and styrene-methylmethacrylate; ethylene-methyl acrylate copolymers, ethylene-ethyl acrylate copolymers, ethylene-ethyl methacrylate copolymers, polystyrene and copolymers of styrene thereof with unsaturated monomers, cellulose derivatives, polyesters, polyvinyl resins and ethylene-allyl alcohol copolymers and the like. The first and second polymers described herein may be the same or different and may include any of the foregoing materials.

Pigments suitable for use in the practice of the present invention should be capable of being media milled, or otherwise commingled and dispersed and thus be dispersible in the solvent and be insoluble in the aqueous phase and yield strong, permanent color. Typical of such pigments are the organic pigments such as phthalocyanines, lithols and the like and inorganic pigments such as $TiO_2$, carbon black and the like. Typical of the phthalocyanine pigments are copper phthalocyanine, mono-chlor copper phthalocyanine, and hexadecachlor copper phthalocyanine. Other organic pigments suitable for use herein include anthraquinone vat pigments such as vat yellow 6GLCL1127, quinone yellow 18-1, indanthrone CL1106, pyranthrone CL1096, brominated pyranthrones such as dibromopyranthrone, vat brilliant orange RK, anthrimide brown CL1151, dibenzanthrone green CL1101, flavanthrone yellow CL1118; azo pigments such as toluidine red C169 and hansa yellow; and metallized pigments such as azo yellow and permanent red. The carbon black may be of any of the known types such as channel black, furnace black, acetylene black, thermal black, lamp black and aniline black. The pigments are employed in an amount sufficient to give a content thereof in the toner from about 1 to 40%, by weight, based upon the weight of the toner, and preferably within the range of 4 to 20%, by weight.

The waxes chosen from use in the practice of the present invention are soluble at ambient temperatures in the solvents employed to form the wax solution used in the present process but insoluble at ambient temperatures in the solvent used to form the pigment dispersion and the organic phase utilized in the present process. These waxes may be selected from among any of the low melting point hydrophobic semi-crystalline polyester waxes evidencing a weight average molecular weight of from about 5,000 to about 80,000 and having a melting temperature within the range of about 55° C.–120° C. Many such waxes are commonly available from commercial sources. Waxes found to be particularly useful for this purpose include both aliphatic and aromatic semi-crystalline polyesters. The aliphatic semi-crystalline polyester waxes include: poly(butylene adipate), poly(hexamethylene sebecate), poly(decamethylene sebecate), and poly[hexamethylene-co-tetramethylene (80/20) cyclohexane dicarboxylate]. The semi-crystalline aromatic waxes include: poly[hexamethylene terephthalate-co-succinate (70/30)], poly[hexamethylene-co-tetramethylene (80/20)-terephthalate-co-isophthalate (80/20)], poly[hexamethylene-co-tetramethylene (80/20)-naphthonate-co-isophthalate (80/20)], poly[hexamethylene-co-2,2-dimethyl propylene (80/20)-terephthalate], and poly[hexamethylene-co-2,2-dimethylpropylene (80/20) naphthonate].

The waxes chosen from use herein should be less surface active than the pigment, and should be hydrophobic relative to the hydrophilic surface of the media milled surface active pigment.

Alternatively and, if desired, the wax coated pigment particles formed as a result of admixing the wax solution and the pigment dispersion can be recovered from the dispersion and then mixed with a polymer material, solvent in which the hydrophobic wax is insoluble at ambient temperature and, optionally, a second polymer material and, optionally, a charge-control agent to form an organic phase which can then be dispersed in an aqueous phase as described previously herein to form an electrostatographic toner composition of the present invention containing wax-encapsulated pigment particles.

Further, and if desired, the wax solution prepared as described herein can be added at ambient temperature directly to an organic phase formed from a pigment and a polymeric material as described herein and a solvent in which the hydrophobic wax is insoluble at ambient temperature and, optionally, a charge-control agent whereupon the wax precipitates out upon the surface of the pigment upon introduction of the wax solution into the organic phase and the organic phase subsequently dispersed in a aqueous phase as described herein to form the wax encapsulated pigment containing toner particles of the present invention.

The invention will be more fully understood by reference to the following exemplary embodiment which is set forth solely for the purpose of exposition and is not to be construed as limiting.

EXAMPLE 1

A solution of poly(decamethylene sebacate) (0.21 intrinsic viscosity as measured at 25° C. in a THF solution) was prepared in dichloromethane at room temperature by adding 15.0 grams of poly(decamethylene sebacate) to 50 grams of dichloromethane. This solution was slowly added at ambient temperature overnight to 99.0 grams of a media milled dispersion of quinacridone magenta pigment. This magenta pigment dispersion was prepared from a mixture of 76.9 grams of quinacridone magenta pigment, 15.49 grams of a commercially available surfactant (Solsperse 24,000) and 7.7 grams of butyl-acrylate styrene copolymer (Piccotoner 1221 manufactured by Hercules-Sanyo, Inc.) in 769.2 grams of ethyl acetate (13% solids mixture). Since poly(decamethylene sebacate) is insoluble in ethyl acetate, addition of its solution prepared in dichloromethane results in its precipitation on the surface of the pigment dispersed in ethyl acetate. This step essentially permits the surface treatment of the dispersed pigment at ambient temperature by taking advantage of the differential solubility in different solvents. The concentration of poly(decamethylene sebacate) employed was maintained at a pigment to poly(decamethylene sebacate) ratio of 13.5:15. Next, 120.15 grams of a commercially available butyl-acrylate styrene copolymer (Piccotoner 1221 manufactured by Hercules-Sanyo, Inc.), 0.6 gram of tetradecyl pyridinium tetraphenylborate (as a charge-control agent) and 465.85 grams of ethyl acetate were added to the resulting wax treated pigment dispersion. Next, the dispersion was added to an aqueous phase comprising 2,250 milliliters of a buffer having a pH of 10 and 150 milliliters of latex particles (3% solids content) of the type described in U.S. Pat. No. 4,965,131. Then, the mixture was subjected to sheer using a Polytron sold by Brinkman followed by a Microfluidizer. Upon exiting, the solvent was removed from the particles so formed by stirring overnight at 25° C. in an open container. The particles formed were found to have a particle size ranging from about 2 to 5 micrometers in size. These particles were then washed with water and dried. The particles evidenced a size distribution ranging from 3 to 4 micrometers and are useful as electrostatographic toner.

EXAMPLE 2

The procedure of Example 1 was repeated with the exception that the intrinsic viscosity of the poly(decamethylene sebacate) was 0.36 as measured at 25° C. in a THF solution.

EXAMPLE 3

The procedure of Example 1 was repeated except that the poly(decamethylene sebacate) of Example 1 was replaced with poly[hexamethylene terephthalate-co-succinate (70/30)] having an intrinsic viscosity of 0.30 as measured at 25° C. in a THF solution.

EXAMPLE 4

A solution of poly(decamethylene sebacate) (0.21 intrinsic viscosity as measured at 25° C. in a THF solution) was prepared in dichloromethane at room temperature by adding 15.0 grams of poly(decamethylene sebacate) to 50 grams of dichloromethane. This solution was slowly added at ambient temperature overnight to 99.0 grams of a media milled dispersion of a bridged aluminum phthalocyanine cyan pigment. This bridged aluminum phthalocyanine cyan pigment dispersion was prepared from a mixture of 273.0 grams of bridged aluminum phthalocyanine cyan pigment and 27.0 grams of butyl acrylate-styrene copolymer (Piccotoner 1221 manufactured by Hercules-Sanyo, Inc.) in 1690.0 grams of ethyl acetate (15% solids mixture). Next, 135.0 grams of Piccotoner 1221, 0.6 gram of tetradenyl pyridinium tetraphenylborate (as a charge-control agent) and 515.0 grams of ethyl acetate were added to the wax treated pigment dispersion. The concentration of poly(decamethylene sebacate) employed was maintained at a pigment to poly(decamethylene sebacate) ratio of 9:10. Next, the dispersion was added to an aqueous phase comprising 2,250 milliters of a buffer having a pH of 10 and 162 milliliters of latex particles (3% solids content) of the type described in U.S. Pat. No. 4,965,131. Then the mixture was subjected to shear using a Polytron sold by Brinkman followed by a Microfluidizer. Upon exiting, the solvent was removed from the particles so formed by stirring overnight at 25° C. in an open container. The particles formed were found to have a particle size ranging from about 2 to 5 micrometers in size. These particles were then washed with water and dried. The particles evidenced a size distribution ranging from 3 to 4 micrometers and are useful as electrostatographic toner.

EXAMPLE 5

The procedure as described in Example 1 was repeated with the exception that the butyl-acrylate styrene copolymer employed in the procedure of Example 1 was replaced with a butyl-acrylate styrene copolymer obtained from Hercules-Sanyo, Inc. designated RES D-194.

EXAMPLE 6

The procedure of Example 4 was repeated with the exception that the butyl-acrylate styrene copolymer employed in the procedure of Example 1 was replaced with a butyl-acrylate styrene copolymer obtained from Hercules-Sanyo, Inc. designated RES D-194.

In order to compare toners prepared in the foregoing manner with those of the prior art in which the pigment particles were not coated with a hydrophobic wax, surface morphologies were studied for different preparative techniques. Thus, for example, a quinacridone magenta latex limited coalescence toner prepared in accordance with conventional prior art limited coalescence in which the pigment particles were not coated with a hydrophobic wax evidenced an irregular surface due to the accumulation of magenta pigment at the surface of the toner during the coalescence process. Generally, the use of a more hydrophobic magenta pigment such as hydrophobic Fanal Pink (a rhodamine) has been found to result in the formation of toner having more of a spherical shape. Micrographs obtained by studying the quinacridone containing latex toner particles prepared as described herein revealed that the spherical nature of the toner is greatly enhanced as the amount of the semicrystalline polyester wax is increased. Accordingly, wax encapsulation of the surface of the pigment with the semi-crystalline polyesters in the manner described herein is shown to be highly beneficial. Furthermore, since it is known that surface active pigments in limited coalescence toners evidence low charge and poor charge stability, any effort to avoid their proximity to the surface of the toner will result in an enhancement of the triboelectric performance. This assertion is vindicated by reference to Table 1 set forth below which contrasts the charging behavior of toner prepared with semi-crystalline polyester wax encapsulation (as described herein) and without such encapsulation.

TABLE 1

| Sample | Pigment | Wax | Q/M (Microcoloumbs/g) | |
|---|---|---|---|---|
| | | | Fresh | Exercised |
| Control | 15% Quinacridone Magenta | None | 140 | 70 |
| Example 1 | 15% Quinacridone Magenta | 10% Poly(decamethylene sebacate) | 198 | 208 |
| Example 2 | 15% Quinacridone Magenta | 10% Poly(decamethylene sebacate) | 162 | 128 |
| Example 3 | 15% Quinacridone Magenta | 10% Poly[hexamethylene terephthalate-co-succinate (70/30)] | 158 | 118 |
| Example 5 | 15% Quinacridone Magenta | 10% Poly(decamethylene sebacate) | 74 | 71 |
| Control | 9% Bridged Aluminum Phthalocyanine Cyan | None | 220 | 120 |
| Example 4 | 9% Bridged Aluminum Phthalocyanine Cyan | 10% Poly(decamethylene sebacate) | 156 | 170 |
| Example 6 | 9% Bridged Aluminum Phthalocyanine Cyan | 10% Poly(decamethylene sebacate) | 104 | 106 |

As is clear from Table 1, after exercise for 5 minutes by passing the toner over a magnetic brush rotating at 2000 rpm in a sealed jar, the charge per mass ratio (Q/M) of the toners prepared according to this invention declined 20.9%, from 162 to 128 ($\mu$C/g) in the case of Example 2; 23.4%, from 158 to 118 ($\mu$C/g) in the case of Example 3; and 4.0%, from 74 to 71 ($\mu$C/g) in the case of Example 5 in contrast to the control toner (no wax encapsulation) which declined 50%, from 140 to 70 ($\mu$C/g) when quinacridone magenta pigment was used as the pigment in the toner compositions and actually increased from 198 to 208 ($\mu$C/g) in the case of the toner composition of Example 1 prepared in accordance with the process of the invention. In addition, the charge per mass ratio of the toners of Examples 4 and 6 also prepared according to the process of the present invention actually increased from 156 to 170 ($\mu$C/g) and from 104 to 106 ($\mu$C/g), respectively when bridged aluminum phthalocyanine was used as the pigment in the preparation of the toner compositions in contrast to the charge per mass ratio of the control toner (no wax encapsulation) made by the conventional limited coalescence process using bridged aluminum phthalocyanine pigment which declined 45.4%, from 220 to 120 ($\mu$C/g).

While the invention has been described in detail with reference to certain preferred embodiments, it will be understood that variations may be made by those skilled in the art without departing from the spirit and scope of the invention. Thus, for example, different polymer compositions, waxes, solvents and pigments may be substituted for those employed in the examples.

It is claimed:

1. A method for the preparation of electrostatographic toner comprising the steps of:
   (a) dissolving at ambient temperature a low melting point hydrophobic semi-crystalline polyester wax in a first solvent capable of dissolving the wax at ambient temperature, thereby forming a solution;
   (b) forming a pigment dispersion at ambient temperature by mixing a pigment, a first polymer material and a second solvent in which the hydrophobic wax is insoluble at ambient temperature;
   (c) admixing the wax solution with the pigment dispersion so resulting in precipitation of the wax upon the surface of the pigment;
   (d) mixing the wax coated pigment dispersion thus formed with a solvent in which the hydrophobic wax is insoluble at ambient temperature, and optionally, a second polymer material and, optionally, a charge-control agent to form an organic phase;
   (e) dispersing the organic phase in an aqueous phase comprising a particulate stabilizer and, optionally, a promoter and homogenizing the resultant mixture; and
   (f) evaporating the solvent and washing and drying the resultant product.

2. The method of claim 1, wherein the pigment employed comprises from about 4 to 20%, by weight, of total solids including wax.

3. The method of claim 1, wherein the wax is a hydrophobic wax and is employed in an amount ranging from about 20 to 200%, by weight, of the pigment employed.

4. The method of claim 1, wherein the relationship between the aqueous phase and the organic phase, by volume, ranges from about 1.5:1 to 9:1.

5. The method of claim 1, wherein the low melting point wax has a melting point within the range of about 55° to 120° C.

6. The method of claim 1, wherein the low melting point wax is poly(decamethylene sebacate), the first solvent is dichloromethane and the second solvent is ethyl acetate and the polymer is buty acrylate-styrene copolymer.

7. The method of claim 1, wherein the particulate stabilizer is selected from the group consisting of highly cross-linked latex particles and $SiO_2$.

8. The method of claim 1, wherein the dispersion comprises media milled quinacridone magenta.

9. The method of claim 1, wherein the polymer is butyl acrylate-styrene copolymer.

10. In a method of preparing electrostatographic toner by dispersing an organic phase in an aqueous phase to yield a layer of particulate suspension stabilizer on the surface of a polymer, the improvement which comprises forming a wax coated pigment dispersion by dissolving a low melting point hydrophobic semi-crystalline hydrophobic wax in a first solvent capable of dissolving the wax at ambient temperature thereby forming a wax solution; forming a pigment dispersion by mixing at ambient temperature a pigment, a first polymer material and a second solvent in which the hydrophobic wax is insoluble at ambient temperature; admixing the wax solution with the pigment dispersion so resulting in the wax precipitating out upon the surface of the pigment; mixing the wax coated pigment dispersion thus formed with a solvent in which the hydrophobic wax is insoluble at ambient temperature and, optionally, a second polymer material and, optionally, a charge-control agent to form the organic phase for dispersing in the aqueous phase.

11. The method of claim 10, wherein the low melting point wax has a melting point within a range of 55° to 120° C.

12. The method of claim 11, wherein the low melting point wax is poly(decamethylene sebacate), the first solvent is dichloromethane, the second solvent is ethyl acetate and the polymer is butyl acrylate-styrene copolymer.

13. The method of claim 12, wherein the pigment dispersion comprises quinacridone magenta.

14. The method of claim 13, wherein the pigment to wax ratio in the pigment dispersion-wax solution is about 2.5:1.

15. The method of claim 14, wherein the wax has a melting temperature of approximately 70° C.

16. A method of preparing a uniform coating of a low melting point hydrophobic semi-crystalline polyester wax on pigment particles comprising the steps of:
   (a) forming a solution of the low melting point hydrophobic wax in a first solvent capable of dissolving the wax at ambient temperature;
   (b) mixing the wax solution with a pigment particle dispersion in a dispersing liquid at ambient temperature to deposit the wax on the pigment particles as a coating on the surface of the particles; and
   (c) recovering the coated pigment particles.

17. A method according to claim 16, wherein the dispersing liquid is water.

18. Electrostatographic toner prepared in accordance with the method of claim 1.

19. Electrostatographic toner prepared in accordance with the method of claim 10.

* * * * *